(12) United States Patent
Sporre et al.

(10) Patent No.: US 7,195,659 B2
(45) Date of Patent: Mar. 27, 2007

(54) REVERSE-FLOW CLEANING SYSTEMS AND METHODS

(75) Inventors: Timothy D. Sporre, Robbinsdale, MN (US); Dominique Renwart, Hoegaarden (BE)

(73) Assignee: Donaldson Company, Inc., Minneapolis, MN (US)

( * ) Notice: Subject to any disclaimer, the term of this patent is extended or adjusted under 35 U.S.C. 154(b) by 0 days.

(21) Appl. No.: 10/731,556

(22) Filed: Dec. 8, 2003

(65) Prior Publication Data

US 2005/0120881 A1    Jun. 9, 2005

(51) Int. Cl.
*B01D 46/04* (2006.01)
(52) U.S. Cl. .............................. 55/302; 55/294; 55/283; 95/278; 95/279; 95/280; 210/333.01; 210/411; 210/791; 210/797; 210/798
(58) Field of Classification Search ................. 55/294, 55/302, 283, 305; 95/278–280; 210/791, 210/797, 798, 333.01, 411
See application file for complete search history.

(56) References Cited

U.S. PATENT DOCUMENTS

| | | |
|---|---|---|
| 3,757,497 A | 9/1973 | Ray |
| 4,033,732 A | 7/1977 | Axelsson et al. |
| 4,218,227 A | 8/1980 | Frey |
| 4,331,459 A | 5/1982 | Copley |
| 4,364,751 A | 12/1982 | Copley |
| 4,681,609 A | 7/1987 | Howeth et al. |
| 4,789,387 A * | 12/1988 | Nemesi et al. ................ 95/280 |
| 5,002,594 A * | 3/1991 | Merritt ........................ 55/302 |
| 5,062,867 A * | 11/1991 | Klimczak .................... 95/280 |
| 5,555,909 A | 9/1996 | Elliott |
| 5,575,826 A | 11/1996 | Gillingham et al. |
| 5,616,171 A * | 4/1997 | Barris et al. .................. 95/280 |
| 6,129,852 A * | 10/2000 | Elliott et al. ................ 210/791 |
| 6,149,716 A * | 11/2000 | Bach et al. ................... 95/280 |
| 6,332,902 B1* | 12/2001 | Simonsen et al. ............. 55/302 |
| 6,902,592 B2* | 6/2005 | Green et al. .................. 55/302 |
| 2004/0187689 A1 | 9/2004 | Sporre et al. |
| 2004/0226443 A1* | 11/2004 | Gillingham et al. .......... 95/273 |

FOREIGN PATENT DOCUMENTS

| | | |
|---|---|---|
| CH | 689 632 A5 | 7/1999 |
| DE | 1903301 | 7/1970 |
| EP | 1 029 576 | 8/2000 |

* cited by examiner

*Primary Examiner*—Minh-Chau T. Pham
(74) *Attorney, Agent, or Firm*—Merchant & Gould P.C.

(57) ABSTRACT

A device and method for cleaning a filter element. The device including a valve interconnected to a blowpipe. A nozzle is positioned at an end of the blowpipe and to direct a pulse of compressed gas into the filter element. The nozzle includes a body and a diffuser arrangement configured to direct multiple jest of the compressed gas into the filter element. The valve is arranged to provide access to each of the valve components from one side of a compressed air manifold.

21 Claims, 17 Drawing Sheets

REVERSE-FLOW CLEANING SYSTEMS AND METHODS

CROSS-REFERENCE TO RELATED APPLICATIONS

This application is related to a U.S. Utility application Ser. No. 10/731,564, entitled Z-FILTER MEDIA WITH REVERSE-FLOW CLEANING SYSTEMS ANT) METHODS, which application is commonly assigned and is being filed on the same date as this application, and is incorporated herein by reference.

TECHNICAL FIELD

This disclosure relates to systems and methods for cleaning filter elements. In particular, this disclosure relates to systems and methods for reverse-flow cleaning Z-filter media and filter elements.

BACKGROUND

Filters are used to purify a variety of fluids, including gas and liquid. The filter media used for the purification, over time, will load with contaminant. Filters are used until they are plugged (contaminant blocks all flow through the media) or until a predetermined restriction level is reached. Both are associated with flow and the work necessary to move the flow. Either too little fluid is allowed to flow through, or too much work is required to move the desired flow due to the higher restriction.

In some systems, pulse jet cleaning is used to periodically remove contaminant from the upstream side of the filter media. Using pulse-cleaning increases the life of the filter by decreasing the restriction and increasing the service interval. Pulse-cleaning has been used with pleated filters in arrangements described in U.S. Pat. Nos. 4,364,751; 4,218,227; 4,331,459; and 5,575,826, each of which is incorporated by reference herein.

SUMMARY OF THE DISCLOSURE

A cleaning system for cleaning a filter, and associated methods, are described. A valve and nozzle for use with the cleaning system is provided. Further, a method of servicing the cleaning system is described.

DETAILED DESCRIPTION

A. Overview Of Gas Filter Arrangement, System, and Method of Operation

Figure 1:
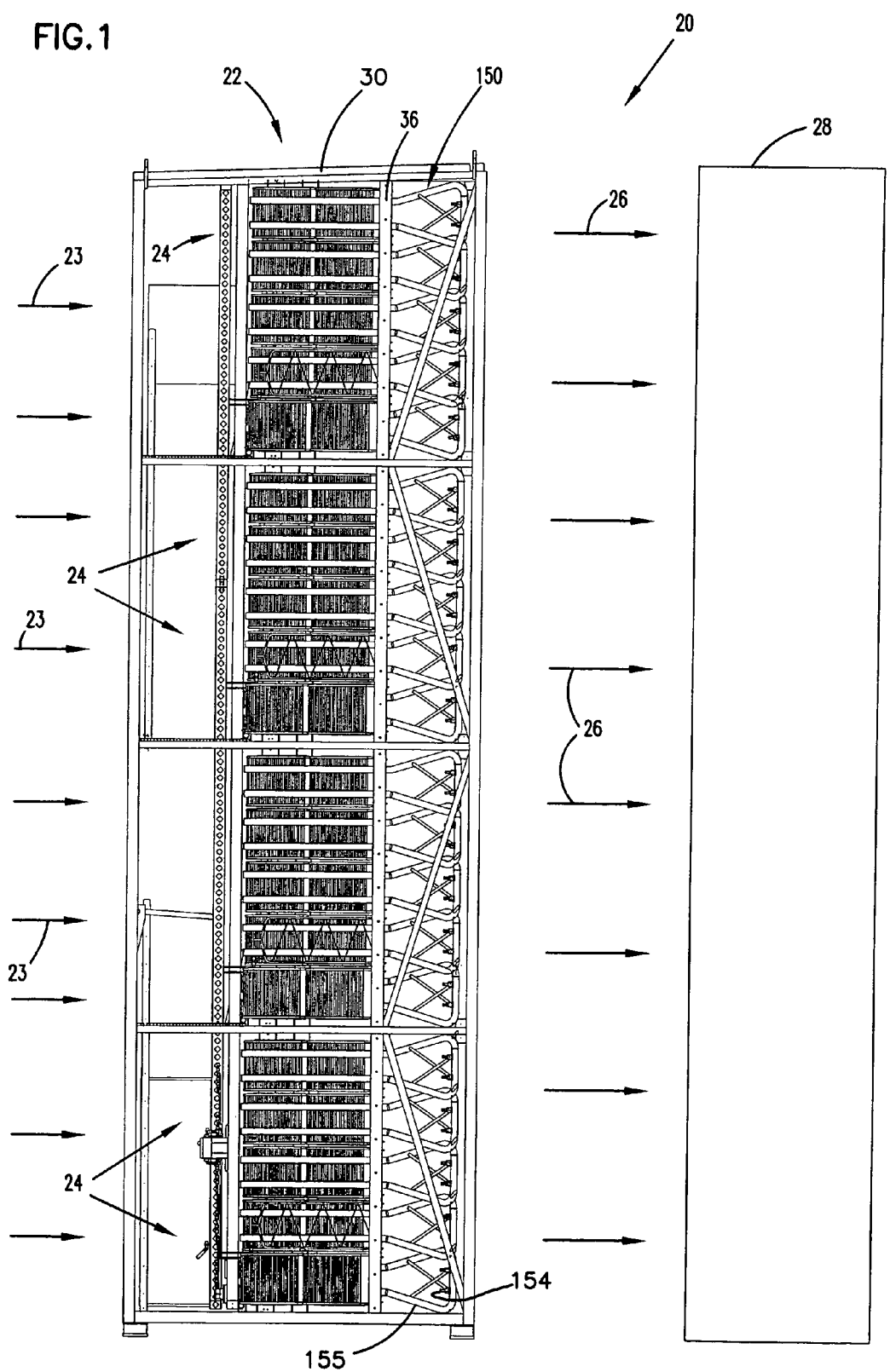
FIG. 1 is a schematic view of one embodiment of a portion of a gas intake system for a gas turbine system having filter cleaner arrangements and utilizing methods in accordance with principles disclosed herein.
Figure 2:
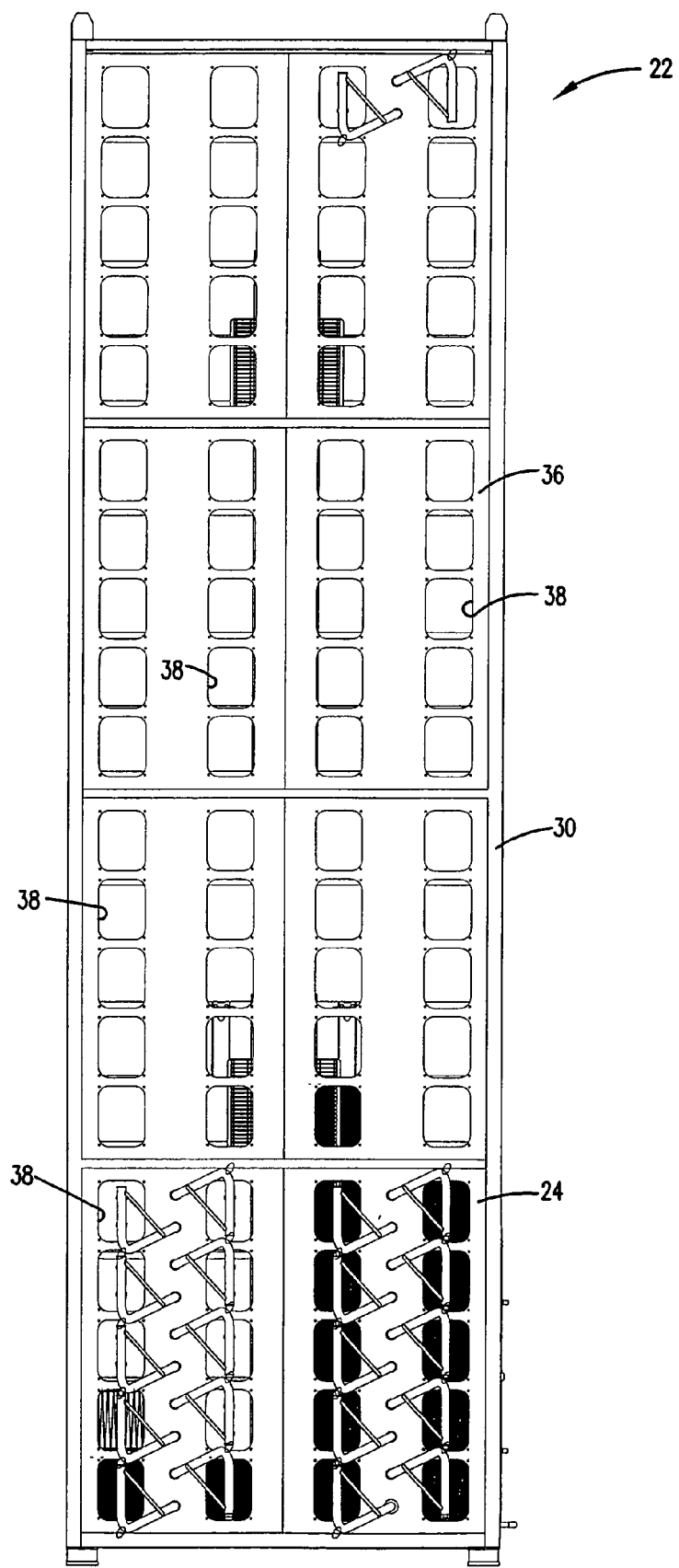
FIG. 2 is a schematic, front elevational view of the gas intake system shown in FIG. 1, with only portions of the system being shown.

The methods of cleaning a filter, filter cleaner arrangements, and constructions disclosed herein are useable with a variety of systems. FIGS. 1 and 2 depict one example system. The example system shown is a gas turbine system illustrated schematically at 20.

In FIG. 1, gas, such as air, is drawn into an air intake system 22 at arrows 23. The air intake system 22 includes a plurality of gas filter arrangements 24 generally held in a tube sheet 36. A frame 30 is used to support the tube sheet 36 and the gas filter arrangements 24. Depicted in FIG. 2, the tube sheet 36 defines a plurality of apertures or through holes 38. The plurality of gas filter arrangements 24 are mounted adjacent to the apertures 38 at an upstream side of the tube sheets 36.

Air is cleaned in the gas filter arrangements 24. The cleaned air then flows downstream from the tube sheet 36 at arrows 26 (FIG. 1) into, for example, a gas turbine generator 28 for use in generating power. Each of the illustrated gas filter arrangements 24 includes at least one filter element 40 (FIGS. 3 and 4) positioned to purify gas before it is used by downstream components, such as the generator 28. A more detailed description of the example system is described in U.S. Provisional Application No. 60/432,923, which application is incorporated herein by reference.

In general, air to be purified flows from the atmosphere through the filter element 40. The filter element 40 is positioned in air flow communication with the tube sheet 36. The purified gas will flow through the aperture 38 and then into systems, such as the generator 28.

Figure 3:
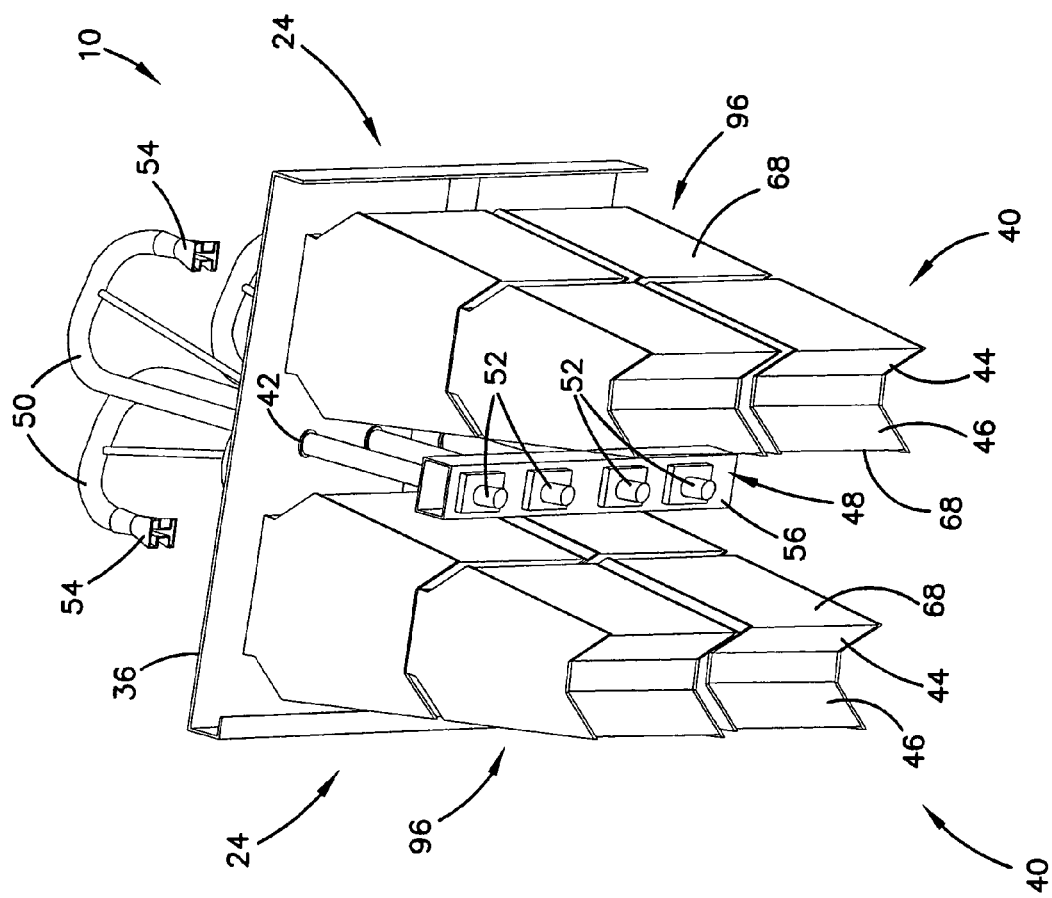
FIG. 3 is a first perspective view of a portion of the gas air intake system depicted in FIGS. 1 and 2 showing one embodiment of a reverse pulse cleaning system in accordance with the principles disclosed herein.
Figure 4:
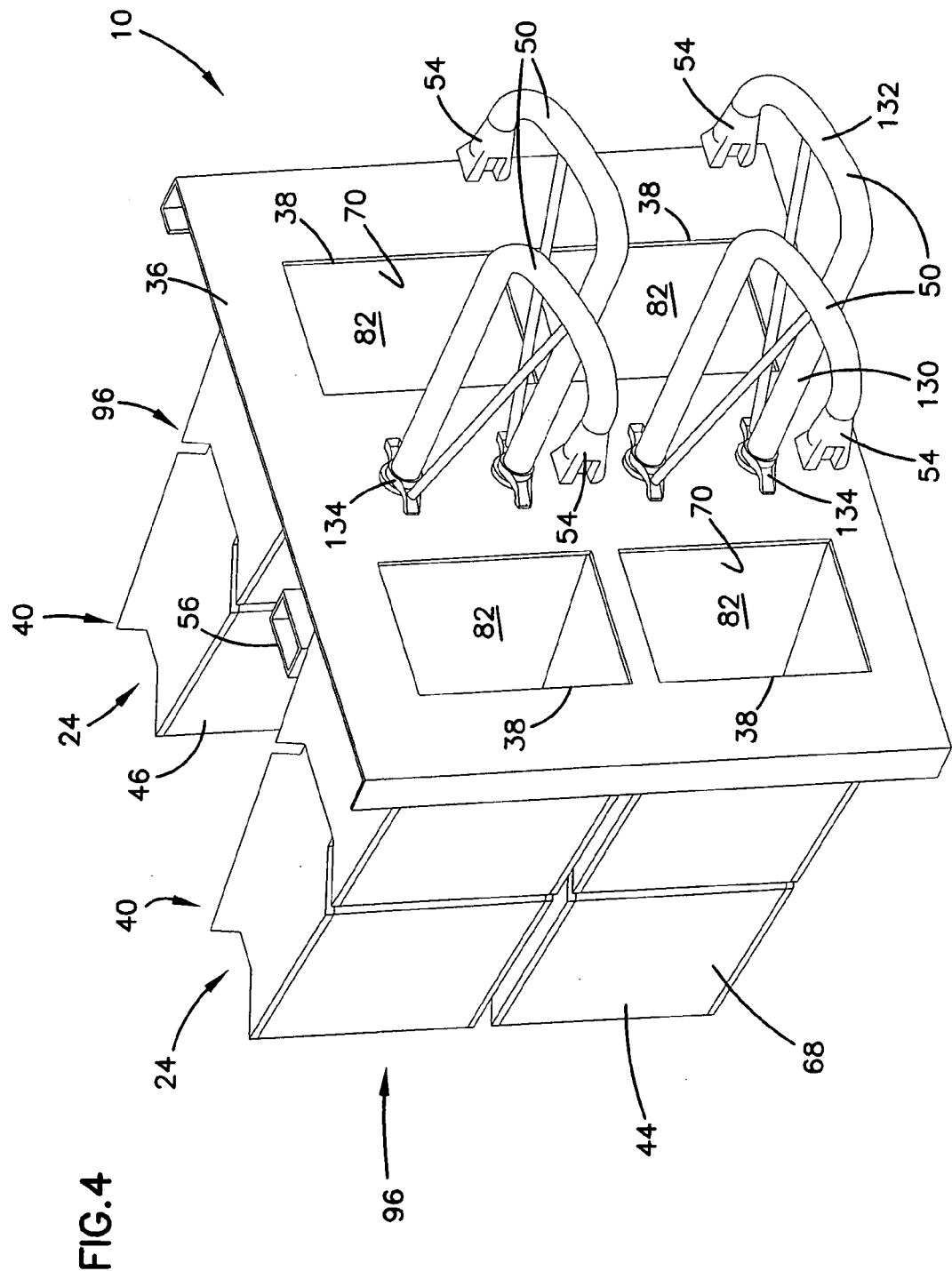
FIG. 4 is a second perspective view of the portion of the gas air intake system and reverse pulse cleaning system of FIG. 3.

Referring to FIGS. 3 and 4, the filter element 40 includes at least a first filter media construction made from a flexible, permeable material. In the illustrated embodiment, the filter element 40 includes a pair of media constructions, depicted as a first media construction 44 and a second media construction 46. Each of the first and second media constructions 44, 46 has upstream flow faces 68 (FIG. 3) and downstream flow faces 70 (FIG. 4). In certain preferred systems, the pair of media constructions 44, 46 are arranged to form an overall V-pack 96. Each of the V-packs 96 defines a clean air plenum 82 between the downstream flow faces 70 of each of the first and second media constructions 44, 46.

After a period of use, a pressure drop across the filter element 40 will increase due to the collection of impurities in the gas stream. The filter elements 40 are periodically cleaned by directing a flow of higher pressure fluid (such as a pulse of compressed gas) into the filter element 40 in a direction from the downstream side of the filter element to the upstream side of the filter element 40. This will remove at least some of the contaminant and particulate matter from the filter element 40 and reduce the restriction across the filter element 40.

Directing a pulse of compressed gas can include periodically directing the pulse of compressed gas into the media construction through the downstream flow face. By "periodic", it is meant that the reverse pulse system 10 can be programmed or can be manually operated such that in desired periods, after a certain length of time or after a certain amount of restriction is detected, there will be a pulse of compressed gas directed through the downstream flow face.

B. Reverse-flow Cleaning System

Referring still to FIGS. 3 and 4, one embodiment of a reverse-flow cleaning system 10 in accord with the principles disclosed is illustrated. In general, the reverse-flow cleaning system 10 uses a flow of higher pressure fluid, such as pulses of gas, (e.g. air) to clean the V-packs 96. By "pulse", it is meant a flow of fluid at a pressure at least 10%, typically at least 25%, higher than the flow at the inlet end, and for a limited time duration. Typically the time durations are under 10 seconds, typically under 5 seconds, and in some cases, less than 0.5 seconds. In general, it has been found that for certain applications, it is beneficial to direct the pulse of compressed gas at a force of between 5–55 inches of water.

In reference now to FIG. 3, the reverse cleaning system 10 includes a plurality of pulse valves 52, each valve corresponding to an associated nozzle 54 (FIG. 4). A compressed air manifold 56 stores compressed fluid or gas. The compressed fluid stored within the manifold 56 is in flow communication with the valves 52. Each of the valves 52 is arranged to direct the compressed fluid through a blowpipe 50 and to one of the nozzles 54. The nozzles 54 are positioned a distance from the tube sheet 36. The distance is at least 8 inches, no greater than 36 inches, and typically 20–28 inches.

In general, the reverse pulse system 10 can be operated using an air compressor (not shown). Periodically, the valves 52 are operated to allow a pulse jet of compressed air to pass through the nozzles 54, through the apertures 38 in the tube sheet 36, and into the clean air plenum 82 of the V-packs 96. The pulse jet of air is directed in a reverse direction, backwards, or as a back flush through the V-packs 96. By the term "in a reverse direction," it is meant that the pulse jet of air is directed opposite to normal gas flow, i.e., filtering air flow (during filtering of ambient air). The reverse direction of air flow will tend to flush out dust or other particles that have collected on the V-pack 96.

Referring now to FIGS. 5–8, the pulse valve 52 of the reverse pulse system 10 generally includes a valve body 60 and a diaphragm 58. A valve hat 62 secures the valve body 60 and diaphragm 58 in operable relation. In particular, the diaphragm 58 is positioned between the valve body 60 and the valve hat 62. Fasteners 64 secure the valve body 60, diaphragm 58 and valve hat 62 relative to one another, and further secure the pulse valve 52 to the manifold 56.

To mount the pulse valve 52 to the manifold 56, the valve body 60 is positioned within first and second apertures 32, 34 (FIG. 5) formed in the manifold 56. In the illustrated arrangement, a majority of the pulse valve 52 is positioned within an inner region 76 of the manifold. The fasteners 64 secure the pulse valve 52 to the manifold 56. A first seal 66, such as an o-ring, is positioned about the circumference of the aperture 32 of the manifold. The first seal 66 is arranged between a mounting flange 90 of the valve body 60 and the manifold 56 to prevent compressed fluid leaks from the manifold 56.

An actuator 80 (schematically represented in FIG. 5), such as a solenoid valve, is mounted to the valve hat 62. The actuator 80 is configured to selectively open and close fluid communication through the pulse valve 52 during pulsing and non-pulsing operation. During a pulsing operation, the valve 52 opens and permits compressed fluid to flow from the manifold 56, through the valve 52 to the blowpipe 50 and the nozzle 54. During non-pulsing operation, the valve 52 is closed and prevents compressed fluid from flowing through the valve 52.

Figure 7:
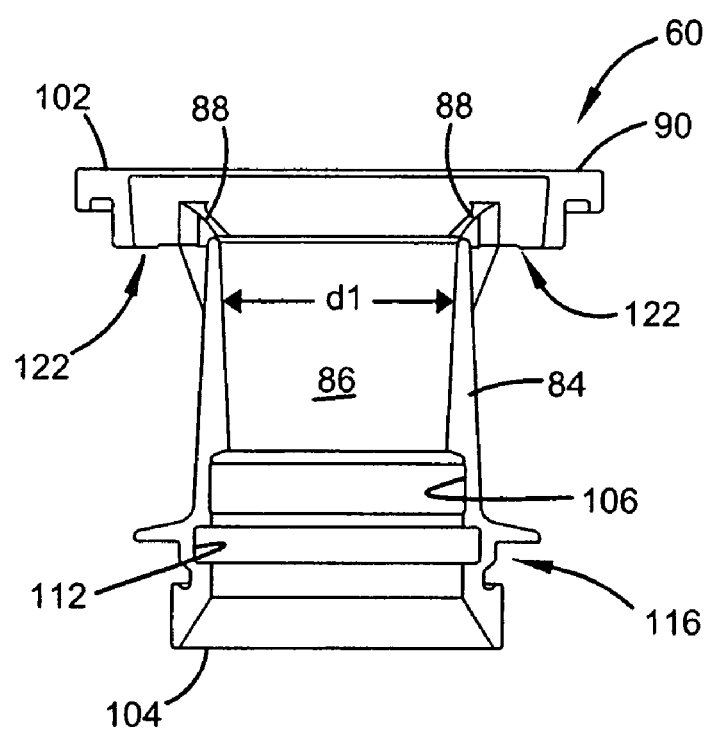
FIG. 7 is a cross-sectional view of one embodiment of a valve body of the valve depicted in FIG. 6, taken along line 7—7.

The valve body 60 of the pulse valve 52 includes a main body portion 84. Support arms 88 extend outward from the main body portion 84 to support the mounting flange 90. As shown in FIG. 7, the main body portion 84 defines a fluid passage 86 for fluid communication between the manifold 56 and the blowpipe 50. In particular, the valve body 60 generally has a first end 102 and a second end 104. A shown in FIG. 5, the blowpipe 50 of the reverse pulse system 10 is interconnected to the second end 104 of the valve body 60 and in fluid communication with the fluid passage 86.

The fluid passage 86 of the main body portion 84 has a diameter A that tapers along the length of the valve body 60. Specifically, the diameter A of the fluid passage 86 tapers or reduces in diameter from the first end 102 of the valve body 60 toward the second end 104. Preferably, the diameter A of the fluid passage 86 tapers to a diameter A' (FIG. 5) that is substantially equivalent to an inner diameter B of the blowpipe 50.

Figure 5:
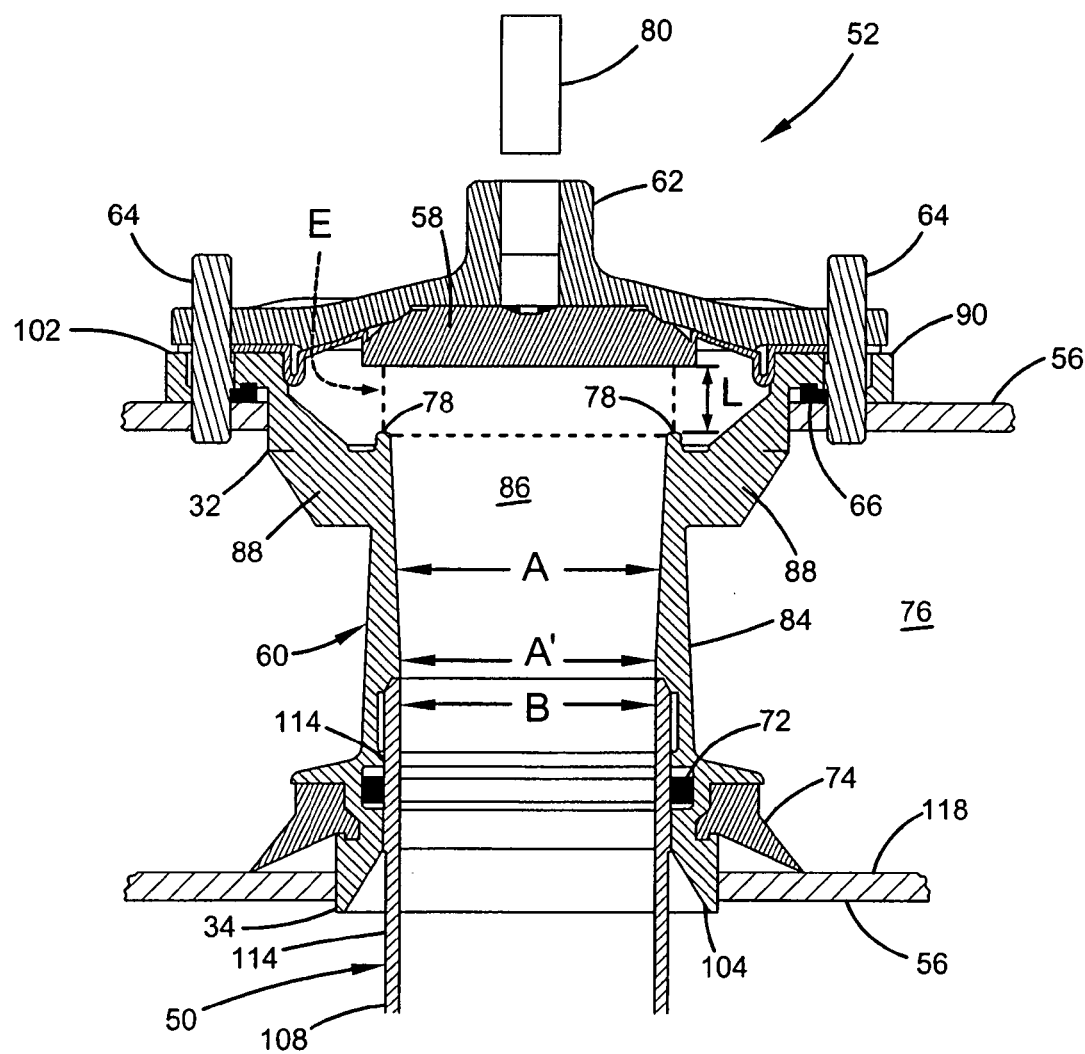
FIG. 5 is a cross-sectional view of one embodiment of a valve of the reverse pulse cleaning system depicted in FIG. 3.

To further illustrate, referring to FIG. 7, a counter bore 106 is located adjacent the second end 104 of the main body portion 84 of the valve body 60. The counter bore 106 is configured to receive a first end 168 (FIG. 5) of the blowpipe 50. Referring to FIG. 5, the counter bore 106 and tapering diameter A of the fluid passage 86 are sized such that the diameter A' of the fluid passage 86 adjacent to the blowpipe 50 is substantially equivalent to the inner diameter B of the blowpipe 50. In other words, the cross-sectional area of the fluid passage 86 having a diameter of A' is substantially equivalent to the cross-sectional area of the blowpipe having the inner diameter B. This feature reduces the overall airflow restriction of the system to utilize as much airflow volume as possible.

Still referring to FIG. 7, an annular groove 112 is located adjacent to the second end 104 of the main body portion 84. The annular groove 112 radial extends outward from the counter bore 106 of the main body portion 84. A second seal 72 (FIG. 5) is positioned within the annular groove 112 to provide a seal between the fluid passage 86 and an outer diameter 114 of the blowpipe 50. The second seal 72 prevents the compressed fluid from escaping the blowpipe 50 during a pulsing operation. Further the second seal 72 prevents the penetration of dirty air into the blowpipe 50 thereby by-passing the filter element 40 during non-pulsing operation. The second seal 72 may include an o-ring or x-seal, for example.

Still referring to FIG. 7, retaining structure 116 formed on the main body portion 84 the valve body 60 is arranged to receive a third seal 74 (FIG. 5). In the illustrated embodiment of FIG. 5, the third seal 74 is a lip seal that prevents compressed fluid from escaping the manifold 56 through the second aperture 34. The third seal 74 contacts an inner surface 118 of the inner region 76 of the manifold 56. As can be understood, other types of seal configurations for each of the first, second, and third seals 66, 72, and 74 of the valve 52 may be used in accord with the principles disclosed.

Referring back to FIG. 3, one feature of the reverse pulse system 10 is that the pulse valve 52 is arranged to provide easy access to components requiring service or periodic maintenance. That is, all of the components of the pulse valve 52 are accessible from one direction or one side 48 of the manifold 56. To illustrate, each of the actuator 80, the diaphragm 58, the valve body 60, and first, second and third seals, 66, 72 and 74 (FIG. 5) of the valve 52 are accessible from the one side 48 of the manifold 56. An operator can simply remove the actuator 80, and/or the valve hat 62, and/or the valve body 60 to access each of the components of the pulse valve 52. In the illustrated arrangement, the manifold 56, the pulse valve 52, and the gas filter arrangements 24 of the system are accessible from only the upstream side of the tube sheet 36.

Referring again to FIG. 5, the main valve body portion 84 defines a shoulder 78 about the perimeter of the fluid passage 86. The diaphragm 58 seals against the shoulder 78 during non-pulsing operation of the pulse valve 52. The seal between the diaphragm 58 and the shoulder 78 permits the manifold 56 to recharge to a pressure level. The diaphragm 58 opens during pulsing operation to release the stored fluid energy from the manifold 56. The diaphragm 58 is configured to move a distance L (as shown in FIG. 5) to provide fluid communication through the valve body 60 during pulsing operation.

Figure 6:
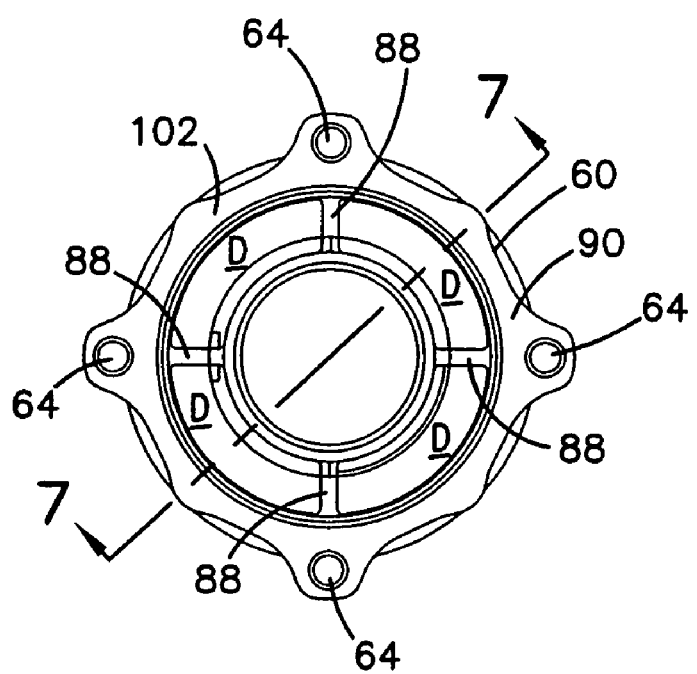
FIG. 6 is a top plan view of the valve of in FIG. 5, shown without a valve hat.
Figure 8:
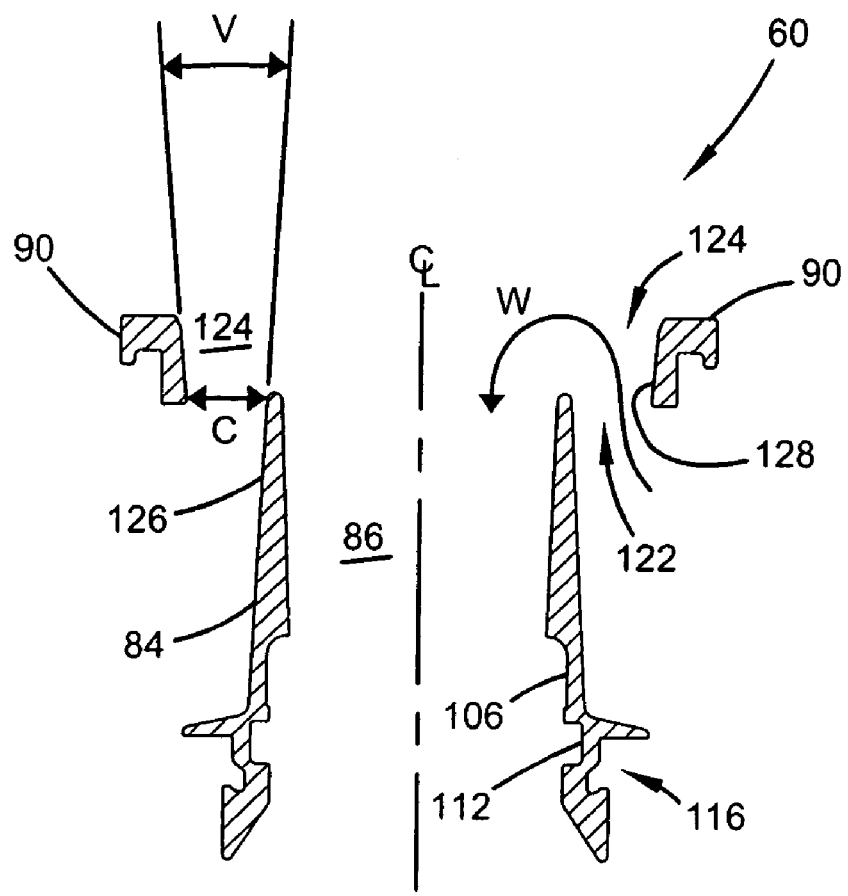
FIG. 8 is a profile view of the valve body of FIG. 7.

Referring now to FIGS. 6–8, the pulse valve 52 includes openings 122 (FIG. 7) formed between the support arms 88, the mounting flange 90, and the main body portion 84 of the valve body 60. The compressed fluid flows from the manifold 56 through the openings 122 to the fluid passage 86 when the pulse valve 52 is open. As shown in FIG. 8, the openings 122 have a dimension C defining a minimum cross-sectional entrance area D (FIG. 6) through which the compressed fluid from the manifold 56 flows to enter the valve body 60. The combined fluid communication entrance areas D of the valve body 60 is preferably at least as large as the cross-sectional area of the blowpipe 50 defined by the diameter B. Because the combined minimum cross-sectional area D is at least as large as the cross-sectional area of the blowpipe 50, the openings 122 do not restrict the amount of flow that can be drawn into the pulse valve 52.

Referring back to FIG. 5, the arrangement of the valve body 60 and diaphragm 58 of the pulse valve 52 defines an annulus surface area E (represented by dashed lines). The annulus surface area E corresponds to the distance L that the diaphragm moves to open, and the circumferential apex of the shoulder 78 of the valve body 60 (that is, the circumferential contact line between the diaphragm 58 and the shoulder 78). The annulus area E is preferably at least as large as the cross-sectional area of the blowpipe 50 defined by diameter B. Because the annulus area E is at least as large as the cross-sectional area of the blowpipe 50, the annulus area E does not restrict of the amount of flow that can be drawn into the pulse valve 52.

In addition, preferably the annulus area E is no larger than the combined fluid communication entrance areas D, while being no smaller than the area of the blowpipe 50. That is, the combined fluid communication entrance area D (FIG. 6) is preferably larger than the annulus area E (FIG. 5) of the valve body 60; more preferably up to about 3 times as large. The larger entrance area D creates a slower flow velocity at the openings 122 where the flow is required to turn or be re-directed into the fluid passage 86 (represented by arrow W in FIG. 8). Slowing the flow velocity at the openings 122 assists in re-directing the volume of compressed fluid to the fluid passage 86 and to the blowpipe 50.

Similarly, referring to FIG. 8, the openings 122 also define an expansion region 124. The expansion region 124 is defined by a tapered outer diameter 126 of the valve body 60 and a tapered surface 128 of the flange 90. The configuration of the expansion region 124 controls the expansion of compressed fluid by reducing the fluid velocity at the expansion region 124. Reducing the fluid velocity in turn reduces the energy loss where the fluid turns and is redirected to the fluid passage 86. Preferably, the expansion region 124 tapers at an angle V of no more than 15 degrees, typically 2 to 5 degrees.

Figure 9:
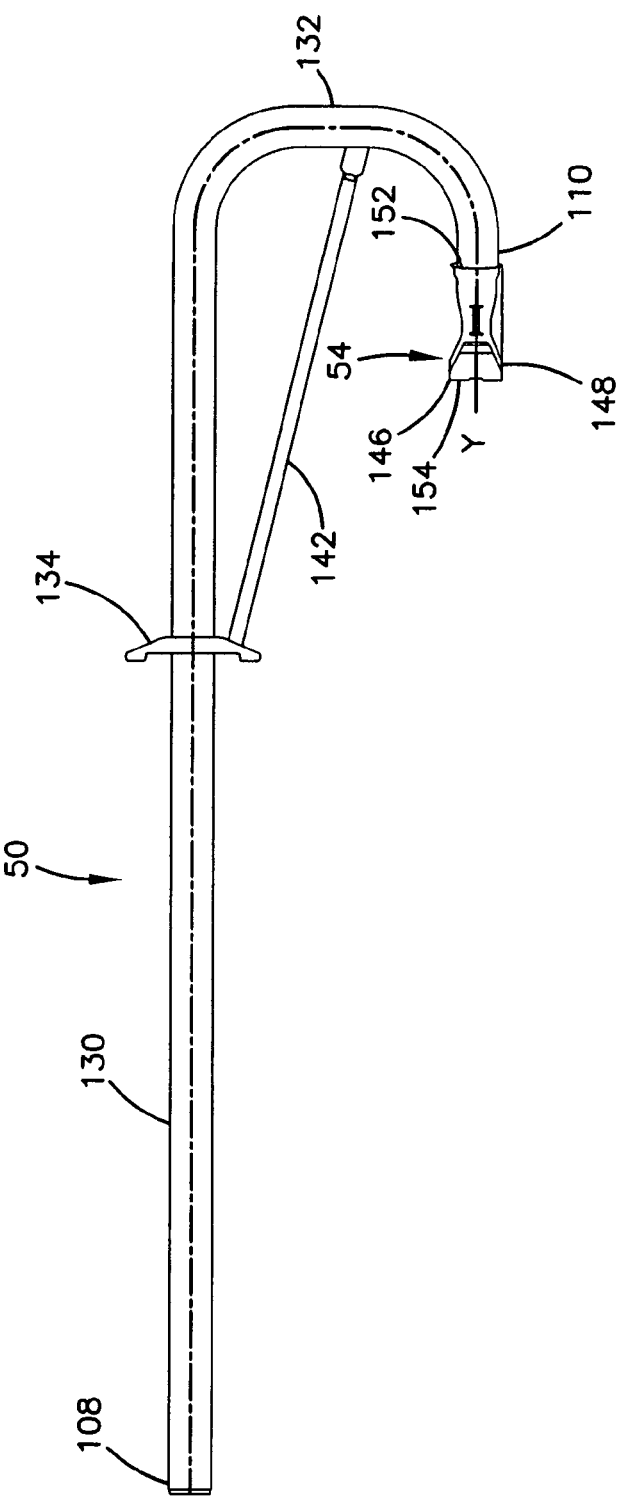
FIG. 9 is a top plan view of one embodiment of a blowpipe of the reverse pulse cleaning system depicted in FIGS. 3 and 4.

Referring now to FIGS. 5 and 9, compressed fluid exits the fluid passage 86 of the pulse valve 52, enters the first end 108 of the blowpipe 50, and flows through the length of the blowpipe toward a second end 110.

The blowpipe 50 includes a generally straight region 130 and a curved region 132. Referring to FIG. 4 again, the generally straight region 130 of the blowpipe 50 extend through a hole 42 (FIG. 3) formed in the tube sheet 36. The curved region 132 directs the flow of compressed fluid in a direction opposite the downstream flow 26 (FIG. 2) of filtered air from the filter element 40. The generally straight region 130 of the blowpipe 50 is secured to the tube sheet 36 by a clamp or bracket 134.

Figure 10:
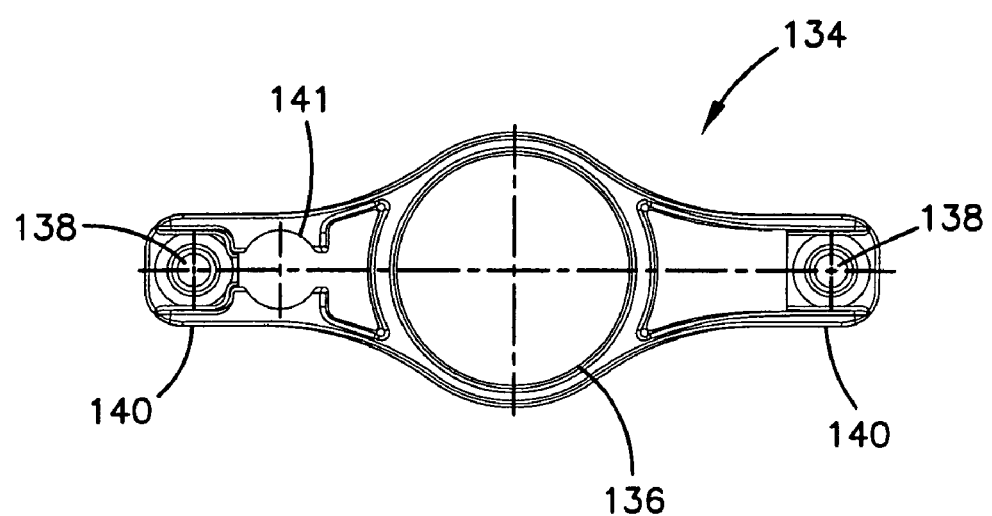
FIG. 10 is a front elevational view of one embodiment of a bracket depicted in FIG. 9.

Referring to FIGS. 9 and 10, the bracket 134 defines a hole 136 sized for receipt of the blowpipe 50. Fasteners holes 138 are formed in opposite flanges 140 of the bracket 134 for receipt of fasteners (not shown) to secure the bracket 134 and the blowpipe 50 to the tube sheet 36. Typically, the fastener holes 138 are threaded and fasteners (not shown) are inserted through the tube sheet 36 from a side adjacent to the filter arrangements 24, and threaded into the fasteners holes 138. Another hole 141 is formed in one of the opposite flanges 140 adjacent to the fastener hole 138. The hole 141 is configured for receipt of a bracing or strut member 142. The strut member 142 is connected, for example, welded, to each of the bracket 134 and the curved region 132 of the blowpipe 50 to structurally support the second end 110 of the blowpipe 50.

Figure 11:
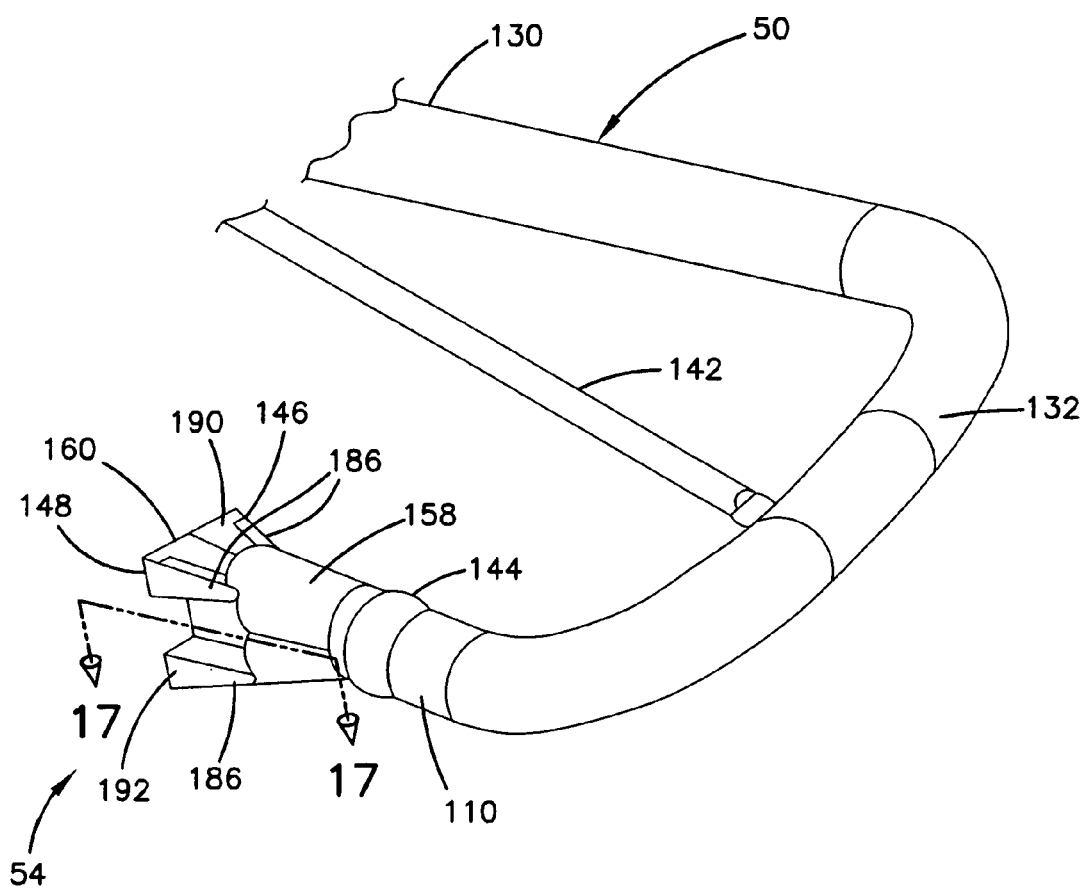
FIG. 11 is a perspective view of a portion of the blowpipe of FIG. 9 showing one embodiment of a nozzle in accordance with the principles disclosed herein.

As shown in FIG. 11, the nozzle 54 of the reverse pulse system 10 is mounted to the second end 110 of the blowpipe 50. Typically the nozzle 54 is secured to the blowpipe 50 at a weldment region 144, although methods other than welding can be used secure the nozzle to the blowpipe 50.

Figure 15:
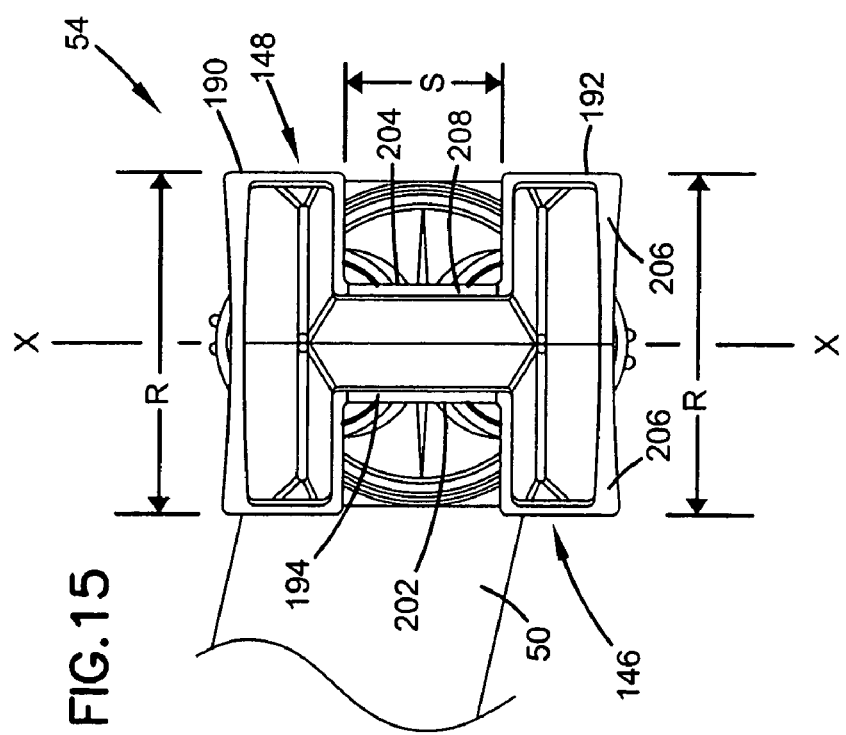
FIG. 15 is a front elevational view of the nozzle of FIG. 11.

In the illustrated embodiment, the nozzle 54 is a molded construction formed by joining first and second molded halves 146, 148. Referring to FIG. 15, generally, the first and second molded halves 146, 148 are defined by a split along a center axis X—X. Typically, the first half 146 of the nozzle 54 is generally a mirrored construction of the second half 148 of the nozzle 54. Accordingly, features having similar constructions and geometries are numbered with the same reference signals for each of the first and second halves 146, 148. Also, features of the nozzle 54 as a whole are numbered with the same reference signal in relation to each of the first and second halves 146, 148.

Figure 12:
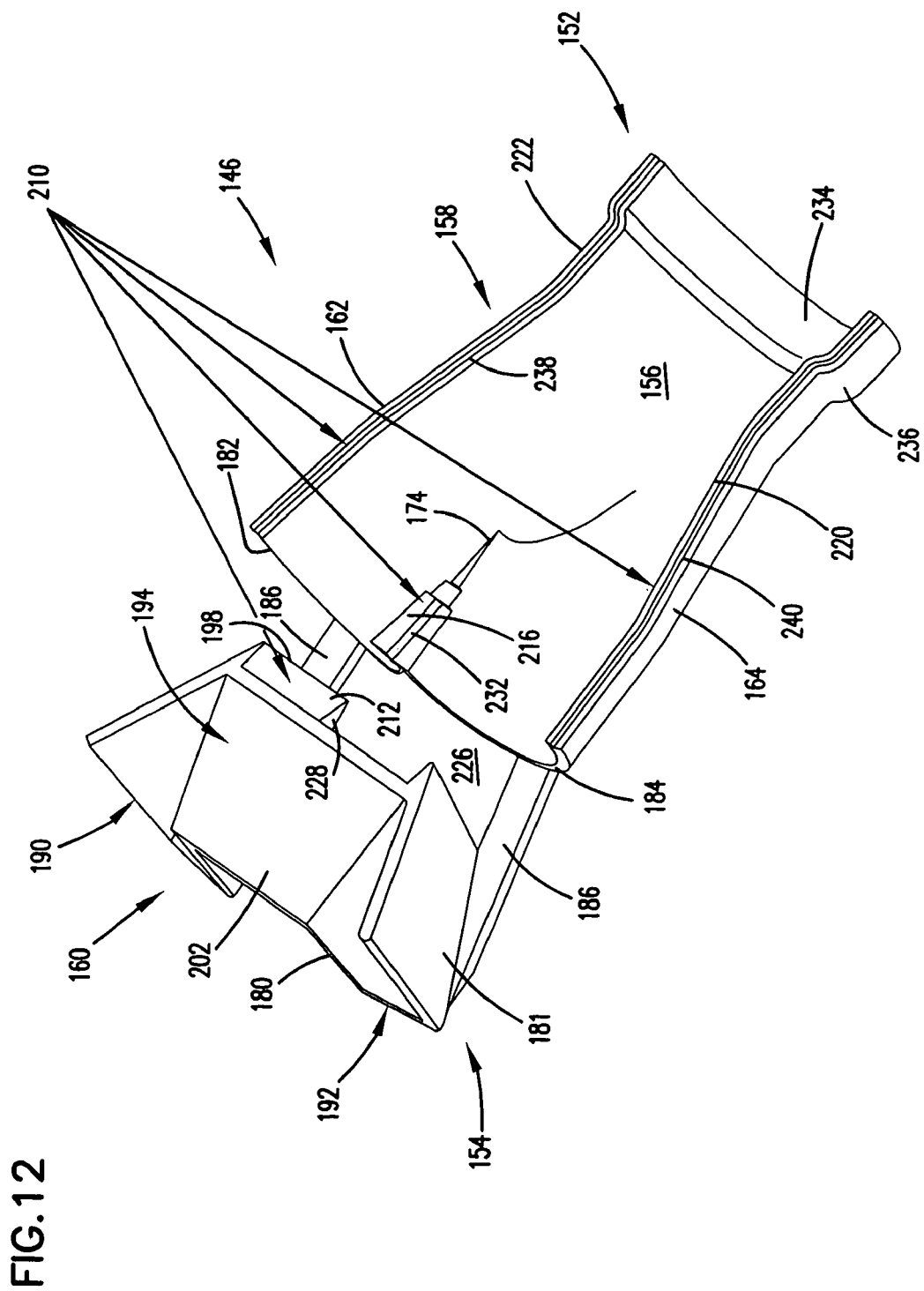
FIG. 12 is a perspective view of a first half of the nozzle depicted in FIG. 11.

The nozzle 54 generally has a first end 152 and a second end 154 (FIG. 9). A longitudinal centerline Y—Y defined by the nozzle 54 extends between the first end 152 and the second end 154 (FIG. 9). As shown in FIGS. 11 and 12, the nozzle 54 includes a nozzle body 158 and a diffuser arrangement 160. The nozzle body 158 defines a passage 156 (FIGS. 12 and 13) that receives the primary fluid jet from the second end 110 of the blowpipe 50. The passage 156 extends from the first end 152 of the nozzle 54 toward the second end 154 of the nozzle. First and second exhaust tubes 162, 164 are formed within the nozzle body 158 between the first and second ends 152, 154 of the nozzle 54. The first and second exhaust tubes define openings 182, 184. The first and second exhaust tubes 162, 164 split the primary fluid jet entering the passage 156 into first and second jets that exit through the opening 182, 184.

Figure 13:
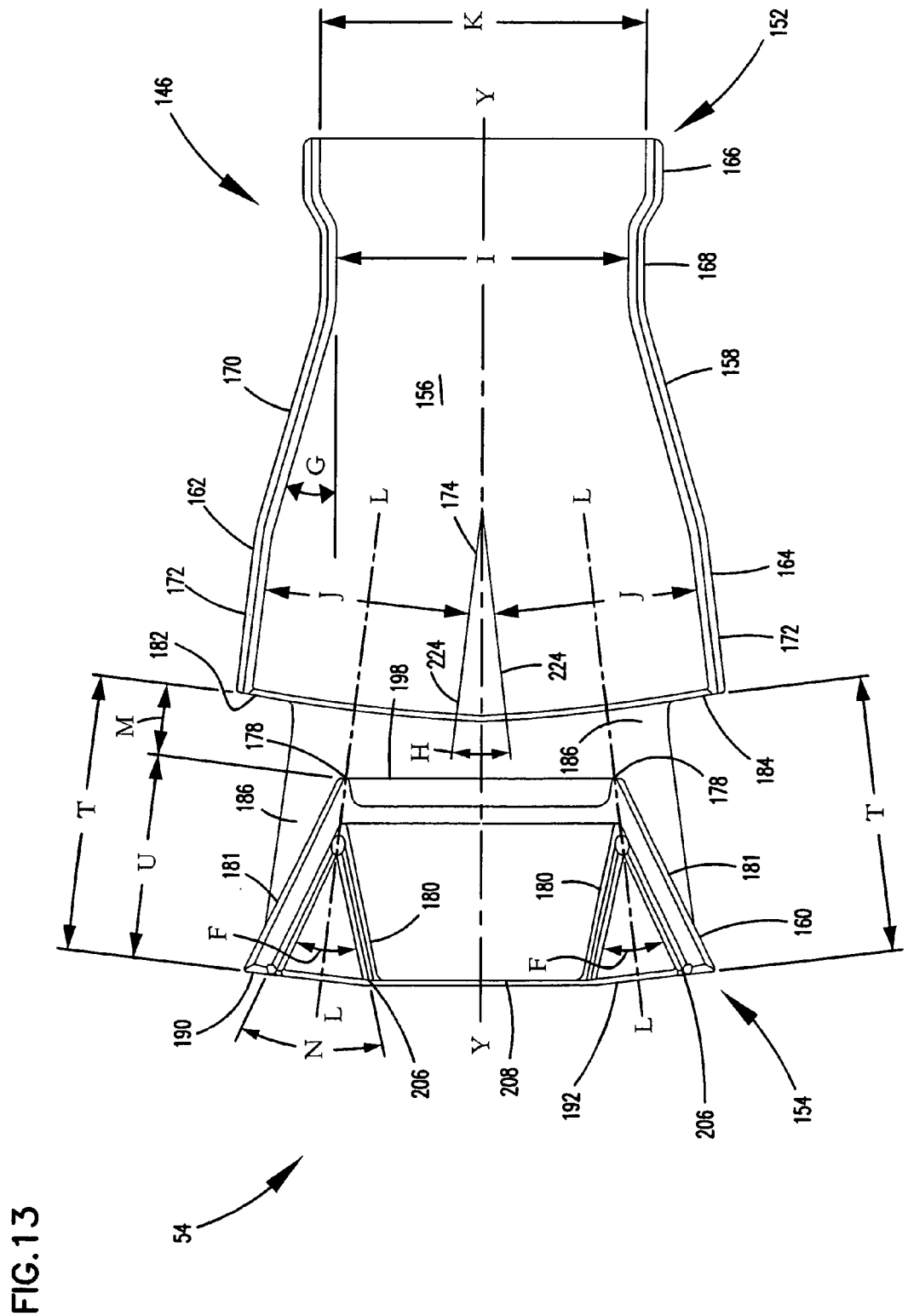
FIG. 13 is a side elevational view of the first half of the nozzle of FIG. 12.

Referring now to FIG. 13, the nozzle body 158 includes a flared perimeter region 166, a transitional region 168, and an expansion region 170. The flared perimeter region 166 is located at the first end 152 of the nozzle 54, and is sized to receive the second end 110 of the blowpipe 50. The transitional region 168 is located adjacent to the flared perimeter region 166 and is generally the region where flow exits the second end 110 of the blowpipe 50 and enters the passage 156 of the nozzle 54. The transitional region 168 preferably has a diameter I that is equal to the inner diameter B of the blowpipe 50.

The expansion region 170 of the nozzle body 158 radially expands outward from the transitional region 168 and is configured to expand and slow the flow of compressed fluid through the passage 156. Typically the expansion region 170 radially expands outward in a direction along the center axis X—X (FIG. 15). The expansion region 170 expands from the transitional region 168 at an angle G of between 0 and 24 degrees. Slowing the flow in the expansion region 170 assists directing the fluid flow through the first and second exhaust tubes 162, 164.

Still referring to FIG. 13, each of the exhaust tubes 162, 164 is defined by a central divider structure 174 and straight sections 172 extending from the expansion region 170 of the nozzle body 158. The central divider structure 174 and straight sections 172 are constructed to separate and define the first and second jets. In the illustrated embodiment, the central divider structure 174 has an angular dimension H of about 0 to 20 degrees. Preferably, the angular dimension H is constructed such that sides 224 of the central divider structure 174 run generally parallel to the straight sections 172 of each of the first and second exhaust tubes 162, 164. This designed assists in directing the first and second jets through the openings 182, 184, toward the diffuser arrangement 160 in separated, non-parallel, independent fluid jets.

Figure 19:
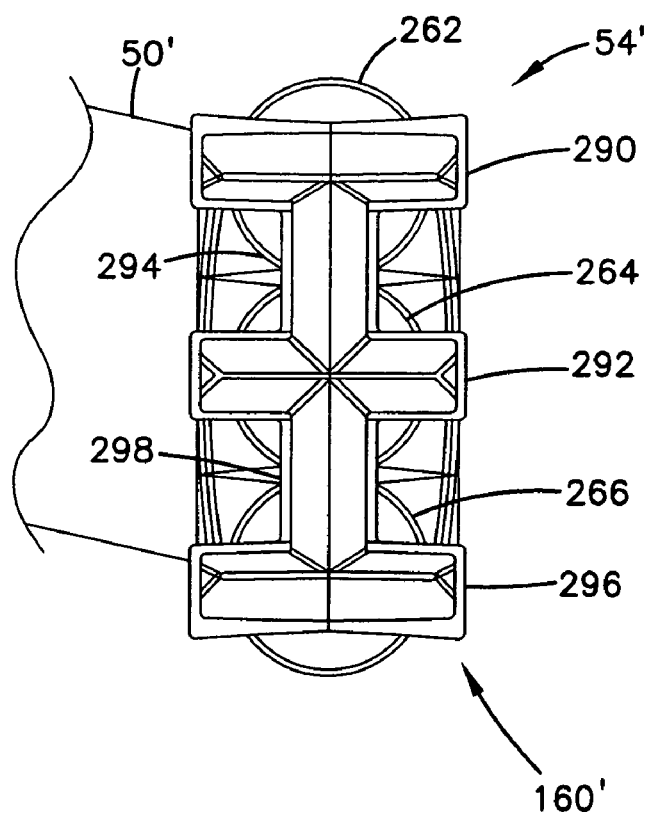
FIG. 19 is a front elevational view of another embodiment of a nozzle in accordance with the principles disclosed herein.

In the illustrated embodiment, the primary fluid jet from the blowpipe 50 is split into two separate jets within the valve body 60. In alternative embodiments, such as shown in FIG. 19, the primary fluid jet can be split into more than two jets. Preferably, the exhaust tube constructions (e.g. 162, 164) are designed such that the combined area defined by the exhaust tube diameters (e.g. J) is equal to the area defined by inner diameter B of the blowpipe 50 (or equal to diameter I of the nozzle 54). To illustrate, in the shown embodiment, the diameter J of each of the first and second exhaust tubes 162, 164 is preferably equal to the inner diameter B divided by two. This configuration, in combination with the configuration the expansion region 170 of the nozzle 54, provides a desired flow control at the openings 182, 184 of the nozzle 54 relative to the volume and speed of the primary fluid jet received from the blowpipe 50. Preferably, the desired flow control at the openings 182, 184 of the nozzle 54 is characterized by 100 percent utilization of the primary fluid jet volume at critical velocity (i.e. the velocity of the flow within the blowpipe 50).

To further illustrate, the expansion region 170 of the nozzle 54 slows the fluid flow of the compressed air to assist in separating the primary jet into multiple jets. However, the separate jets need to be sped up to prevent inefficiencies in flow control and undesired shock waves and noise. Therefore, the combined area defined by diameters J of the exhaust tubes 162, 164 is less than that of the area defined within the expansion region 170. Accordingly, the speed of the multiple jets increases as the fluid flows from the larger expansion region 170 to the reduced area defined by the diameters J of the exhaust tubes 162, 164.

Similar advantages can be achieved in alternative arrangements in accord with the principles disclosed. For example, the expansion region 170 of the nozzle 54 may be configured at an angle G greater than that illustrated in FIG. 13 and described above. Or, the expansion region 170 may be configured at a lesser tapering angle than angle Z in FIG. 17 (i.e. a lesser tapering angle including a flattened portion of the expansion region 170 having an angle of 0 degrees, or an expanding portion of the expansion region having an angle greater than 0 degrees). In providing a lesser tapering angle Z, the expansion area 170 increases.

To achieve the desired flow control in such an alternative arrangement, preferably the combined area defined by the diameters J of the exhaust tube 162, 164 are approximately 85–95 percent of the largest area defined by the alternative expansion region, but still equal to, or greater than, the area of the blowpipe 50. By designing within these parameters, the multiple jets are characterized by 100 percent utilization of the primary fluid jet volume and flow at critical velocity.

Referring back to FIG. 11, the diffuser arrangement 160 of the nozzle 54 is located at the second end 154 of the nozzle. The diffuser arrangement 160 has a number of wedge constructions including a first wedge 190 and a second wedge 192. Each of the first and second wedges 190, 192 is triangular shaped having an apex 178 (FIG. 13) and inner and outer sides 180, 181 extending from the apex 178. As shown in FIG. 13, the apex 178 is located along the centerline L—L of the openings 182, 184 of the exhaust tubes 162, 164, and oriented to oppose the openings 182, 184 of the exhaust tubes. In other words, the cross-sectional area F of the volume defined by the sides 180, 181 of the wedges 190, 192 is generally oriented perpendicular to the centerline L—L of the exhaust tubes 162, 164.

The wedges 190, 192 are configured with an angle of expansion N. Each of the wedges may include similar angles of expansion or can be configured with different angles of expansion. In one embodiment, the angle of expansion for each of the first and second wedges 190, 192 is preferably between 17.5 degrees and 57.5 degrees; typically about 37.5 degrees. In the illustrated embodiment, each of the angles of expansion N for the first and second wedges is generally the same. Referring to FIG. 15, the first and second wedges have longitudinal dimensions R. The longitudinal dimensions R of each of the wedges 190, 192 are generally parallel to one another.

Figure 17:
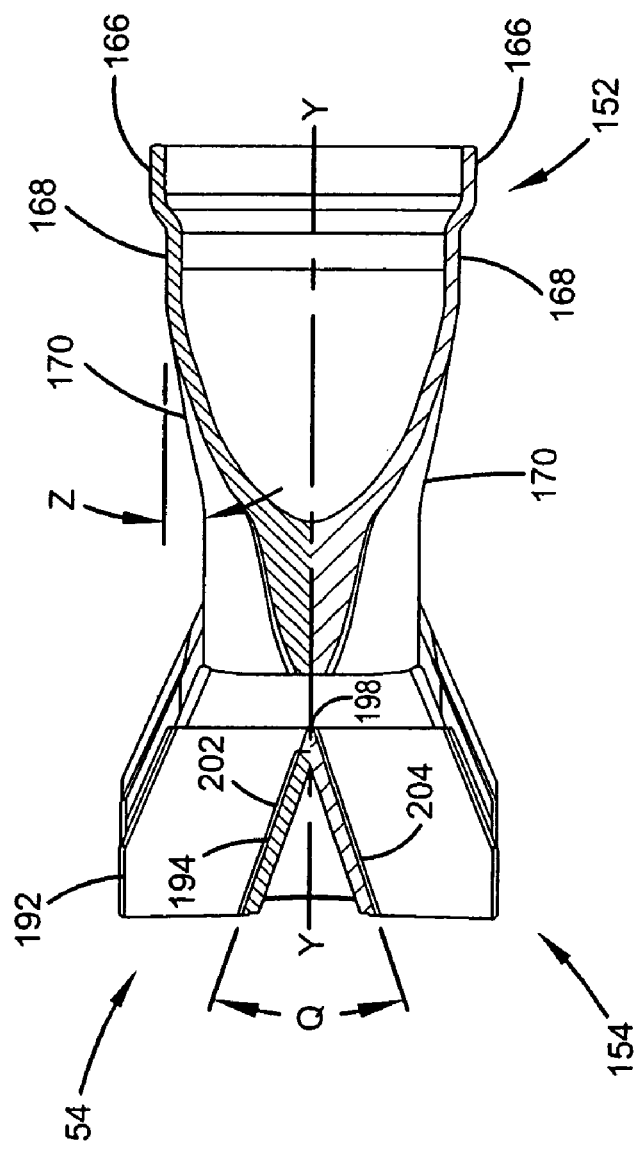
FIG. 17 is a cross-sectional view of the nozzle of FIG. 11, taken along line 17—17.

Referring now to FIG. 15 the diffuser arrangement 160 also includes a third wedge 194 positioned between the first and second wedge 190, 192. The third wedge 194 has a longitudinal dimension S (FIG. 15) that is generally perpendicular to the longitudinal dimensions R of the first and second wedges 190, 192. The third wedge 194 is also triangular shaped having an apex 198 (FIGS. 12 and 13) and first and second sides 202, 204 (FIG. 15) extending from the apex 198. The apex 198 is located along the center axis X—X and is also centered on the centerline L—L of the exhaust tubes 162, 164. Referring to FIG. 17, the third wedge 194 has an angle of expansion Q. The angle of expansion Q may be the same as the angle of expansion N for each of the first and second wedges, or can be configured with a different angle of expansion. The angle of expansion Q of the third wedge 194 is preferably between 17.5 degrees and 57.5 degrees; typically about 37.5 degrees Referring to FIGS. 12–14, the wedges 190, 192, 194 of the diffuser arrangement 160 are support by arms 186 projecting from the exhaust tubes 162, 164 of the nozzle body 158. In the illustrated embodiment, four arms 186 project from the exhaust tubes. As shown in FIG. 1, the arms 186 couple to opposite outer surfaces 188 (FIG. 14) of each of the first and second wedges 190, 192.

The arms 186 position the wedges 190, 192, 194 a distance M (FIG. 13) from the openings 182, 184 of the exhaust tubes 162, 164 to provide a gap 226 (FIG. 12) between the nozzle body 158 and the diffuser arrangement 160. In the illustrated embodiment, the distance M between the apex 178, 198 of each of the wedges 190, 192, 194 and the openings 182, 184 is preferably between about 0 and 2 inches; typically about 0.5 inches.

Referring again to FIGS. 13 and 15, the each of the first and second wedges defines a base 206 opposite the apex 178. In the illustrated embodiment, the planes of each of the bases 206 are generally parallel to the planes of the respective openings 182, 184 of each of the first and second exhaust tubes 162, 164 (as represented in FIG. 13 by reference letter T). In other words and as shown in FIG. 13, the planes of the bases 206 are generally non-perpendicular to the longitudinal centerline Y—Y of the nozzle 54. In contrast, a base 208 of the third wedge 194 is generally oriented perpendicular to the longitudinal centerline Y—Y. In an alternative embodiment, the bases 206, 208 of the wedges 190, 192, 194 may be include other angular orientations or angular relations. Preferably, the angular relations are within a range of plus or minus 20 degrees of the typical orientations illustrated.

Figure 14:
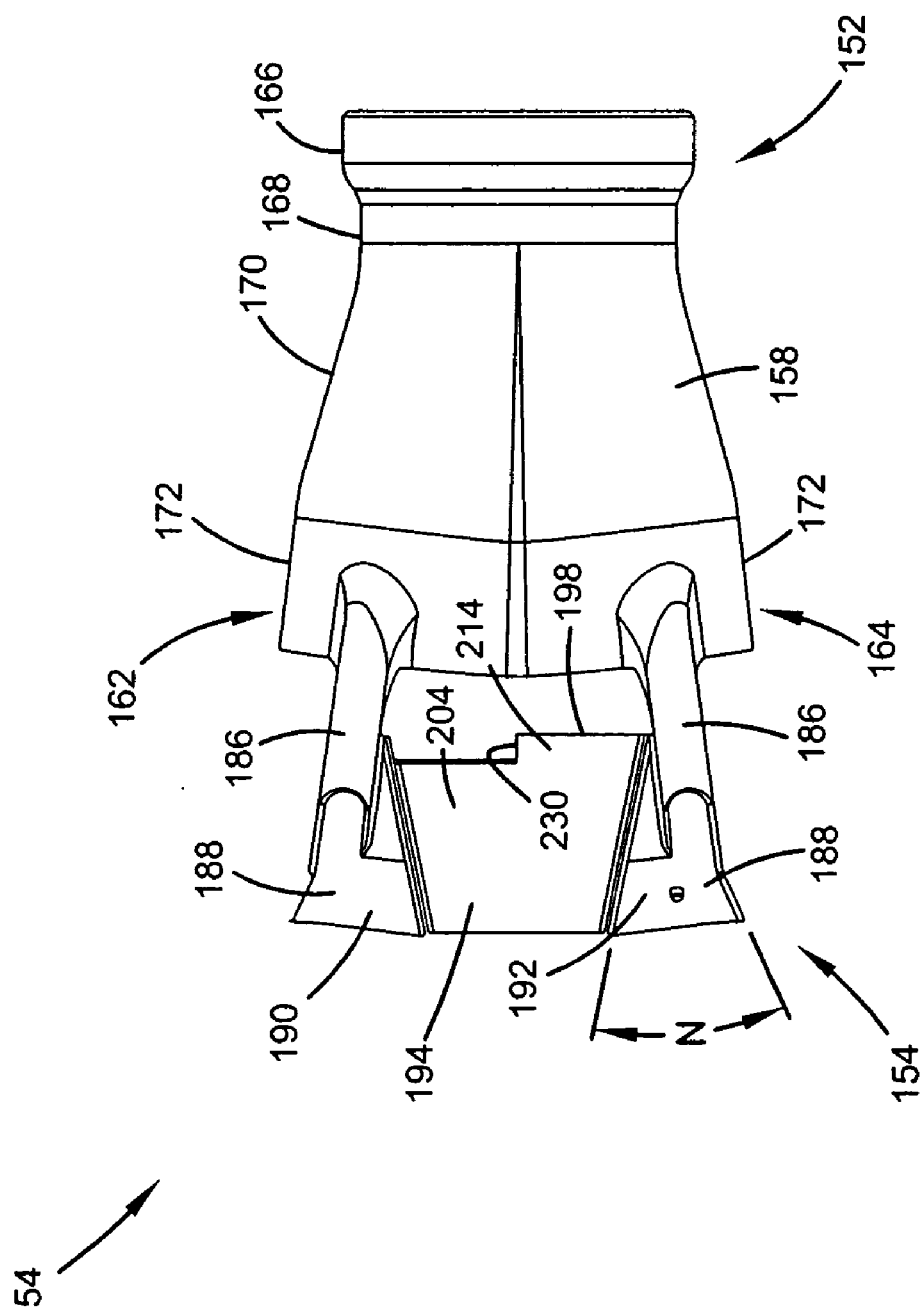
FIG. 14 is a side elevational view of a second half of the nozzle depicted in FIG. 11.
Figure 16:
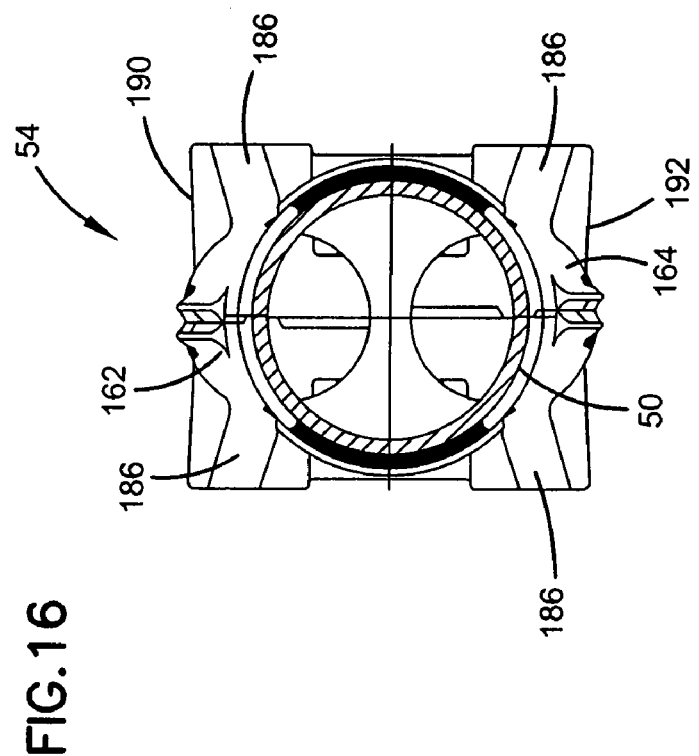
FIG. 16 is a rear elevational view of the nozzle of FIG. 15.

As can be understood, and shown in part in FIGS. 13–15, the apexes 178, 198 of the wedges 190, 192, 194 form an "I" shape. The "I" shape apexes all lie on a single plane. In contrast, each of bases 206, 208 (FIG. 15) of the wedges also form an "I" shape; however, each portion of the "I" defined by the bases 206, 208 of the respective wedges lies on a plane different than the other portions.

Still referring to FIG. 13, the wedges 190, 192, 194 each have a general height or depth U defined between the apexes 178, 198 and the base 206, 208. In the illustrated embodiment, the depth U of each of the wedges is generally equal to the diameters J of the first and exhaust tubes 162, 164. That is, the ratio of the depth U of the wedges to the diameter J of the tubes is typically about 1:1. It is contemplated that in other configuration the ratio may vary between 1:3 to 3:1.

Referring back to FIG. 12, each of the first and second halves 146, 148 includes an interlocking arrangement 210. The interlock arrangement 210, in conjunction with a weldment about the seams of the first and second halves, is configured so that during pulsing operation, the halves do no separate from the force of the compressed fluid jet. As can be understood, the elements of the interlocking arrangement 210 will be described with regards to the first half 146 of the nozzle; however, the second half 148 has similar mirrored elements that interlock with the elements of the first half 146. Generally, the interlocking arrangement includes a wedge portion 212, a tab 216, and inner and outer seam structures 220, 222. Each of these specific elements shown in the first half 146 (FIG. 12) correspond to similar elements of the second half 148.

The wedge portion 212 of the interlocking arrangement 210 is defined by the third wedge 194 (partially shown in FIG. 12) of the diffuser arrangement 160. The corresponding wedge portion 214 of the second half 148 is illustrated in FIG. 14. Each of the corresponding wedge portions 212, 214 partially defines the apex 198 of the third wedge 194. When joined, surfaces 228, 230 of each of the wedge portions 212, 214 abut one another to prevent separation of the halves 146, 148 of the nozzle 54 in the direction of the surfaces 228, 230.

The tab 216 of the interlocking arrangement 210 is formed in the nozzle body 158 between the first and second exhaust tubes 162, 164. In particular, the tab 216 is formed on the central divider structure 174 of the nozzle body 158. Similar to the wedge portions, the tabs of each half 146, 148 includes surfaces 232 (only one tab 216 shown) that abut one another to prevent separation of the halves 146, 148 of the nozzle 54 in the direction of the tab surfaces.

The inner and outer seam structures 220, 222 of the interlocking arrangement 210 extend along the nozzle body 158. The inner seam structure is congruent with an inner surface 234 of the nozzle body 158 and the outer seam structure is congruent with an outer surface 236 of the nozzle body 158. Each of the seam structure includes seam surfaces 238, 240. When the halves 146, 148 of the nozzle 54 are joined, the inner and outer seam structures 220, 222 interlock to prevent separation of the halves 146, 148 of the nozzle 54 in the direction of the seam surfaces 238, 240.

C. Methods of Operation and Service

In general, the systems and configurations described herein will comprise providing the air intake system 22 for use in cleaning ambient air before it is used by the gas turbine generator 28 (FIG. 1). In use, ambient air will be directed into the gas filter arrangements 24. The air will enter the upstream flow faces 68 (FIG. 4), pass through the Z-media 44, and exit through the downstream flow faces 70 into the clean air plenum 82. The cleaned air will then flow through the apertures 38 in the tube sheet 36 and be directed into the generator 28. After a period of use or after reaching some measured restriction, the pulse reverse pulse system 10 will direct a pulse of compressed gas or air through the apertures 38, into the clean air plenum 82, through the downstream flow face 70, through the Z-media 44, and out through the upstream flow face 68. This will knock loose dust or other particulate matter from the filter element.

In particular, the actuator 80 of the reverse pulse system 10 will provide a signal to open the pulse valve 52. When the valve 52 opens, a jet of compressed fluid flows from the manifold 56 through the valve 52 and to the blowpipe 50. The jet enters the nozzle 54 as a primary fluid jet. The primary fluid jet is then split by the nozzle into first and second jets. The diffuser arrangement 160 of the nozzle directs and distributes the first and second jets into the clean air plenum 82 such that the jets fill the rectangular aperture 38 adjacent the clean air plenum 82 of the filter element 40.

Figure 18:
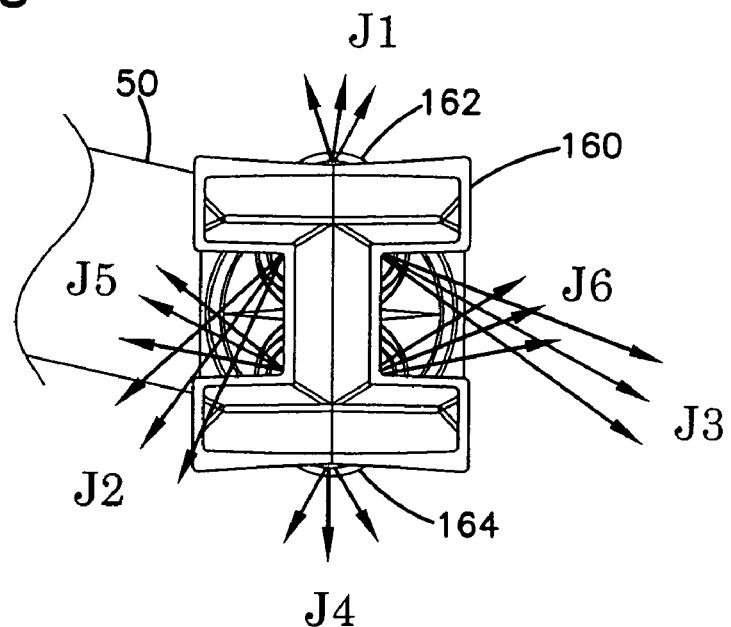
FIG. 18 is a front elevational view of the nozzle of FIG. 15.

In particular, each of the separate first and second jets is further separated into jet portions by the diffuser arrangement 160. As shown in FIG. 18, a first jet exiting the first exhaust tube 162 is further split into three jet portions J1, J2, and J3; and a second jet exiting the second exhaust tube 164 is further split into three jet portions J4, J5, and J6. That is, the nozzle 54 separates and distributes the one primary fluid jet from the blowpipe 50, into a total of six separate jet portions J1–J6. The six jet portions J1–J6 fill the rectangular clean air plenum 82 of the filter element 40, and thereafter flow through the downstream flow face 70, through the Z-media 44, and out through the upstream flow face 68 to move dust and other particular away from the upstream flow face 68. It is to be understood that the arrows representing each of the jet portions J1–J6 in FIG. 18 do not necessarily represent the directional flow of the jets, rather the jets are generally directed out of the page of FIG. 18 and directionally angled by the shape of the wedges.

The nozzle 54 can be configured to separate the primary fluid jet from the blowpipe into a number of jets and jet portions to fill the clean air plenum of differently arranged filter elements. For example, referring to FIG. 19, another embodiment of the nozzle 54' is illustrated. In this embodiment, the primary jet from a blowpipe 50' is separated into three jets exiting from three exhaust tubes 262, 264, 266. The diffuser arrangement 160' includes five wedges 290, 292, 294, 296, and 298 that further separate the three jets into a total often separate jet portions.

The above specification provides a complete description of the invention. Since many embodiments of the invention can be made without departing from the spirit and scope of the invention, certain aspects of the invention reside in the claims hereinafter appended.

What is claimed is:

1. A filter cleaning system for use with a filter having a front and a back, the front defining an open plenum, the filter cleaning system comprising:
   (a) a fluid manifold;
   (b) a valve arranged in fluid communication with the fluid manifold;
   (c) a nozzle configured to receive a primary fluid jet from the fluid manifold by operation of the valve, the nozzle including a diffuser that separates the primary fluid jet into multiple jets;
   (d) a blowpipe that provides fluid communication between the nozzle and the valve, the blowpipe being configured to position the nozzle adjacent to the front of the filter and to position the valve adjacent to the back of the filter;
   (e) wherein a fluid flow pathway is provided through the valve, the blowpipe, and the nozzle.

2. The filter cleaning system of claim 1, wherein the diffuser of the nozzle is configured to direct the multiple jets into the open plenum in such a pattern as to fill a rectangular volume of the open plenum.

3. The filter cleaning system of claim 1, wherein the blowpipe defines a first diameter, and each of the valve and the nozzle are sized and constructed such that a cross-sectional area defined by the first diameter of the blowpipe further defines a minimum cross-sectional area of the fluid flow pathway of the system.

4. The filter cleaning system of claim 1, wherein the valve includes a valve body defining openings and a fluid passage, the openings being in fluid communication with the manifold, the fluid passage being in fluid communication with the blow pipe.

5. The filter cleaning system of claim 4, wherein the valve body defines an annulus area located between the openings and the fluid passage, the annulus area being at least as large as a cross-sectional area defined by a diameter of the blowpipe.

6. The filter cleaning system of claim 5, wherein the annulus area is no larger than a combined area defined by the openings of the valve body.

7. The filter cleaning system of claim 1, wherein the nozzle includes multiple exhaust tubes each having an inner diameter, and wherein a total cross-sectional area defined by the inner diameters of the multiple exhaust tubes is equal to or greater than an inner diameter of the blowpipe.

8. The filter cleaning system of claim 7, wherein the nozzle defines a primary fluid jet passage, the total cross-sectional area defined by the diameters of the multiple exhaust tubes being equal to at least 95 percent of a largest diameter of the primary fluid jet passage.

9. A nozzle for use with a filter cleaning system, the nozzle comprising:
   (a) a nozzle body having a first end and a second end, the first end defining a primary fluid jet passage, the second end defining multiple exhaust tubes; and
   (b) a diffuser arrangement located adjacent to the second end of the nozzle body, the diffuser arrangement including a number of wedge constructions.

10. A manifold and valve arrangement for use with a filter cleaning system, the arrangement comprising:
    (a) a manifold defining an interior, the manifold including a first outer surface;
    (b) a valve mounted to the manifold, the valve including:
        (i) a valve body;
        (ii) first and second seals, the first seal providing sealing contact between the valve body and the first outer surface of the manifold, the second seal providing sealing contact between the valve body and the interior of the manifold;
        (iii) openings formed in the valve body that provide fluid communication between the valve and the manifold, the openings being located within the interior of the manifold when the valve is mounted to the manifold; and
        (iv) a diaphragm selectively positionable in open and closed positions to control fluid communication through the valve.

11. A valve, comprising:
    (a) a valve body defining a fluid passage, the fluid passage having a first end and a second opposite end, the fluid passage tapering from the first end to the second end;
    (b) a mounting flange interconnected to the valve body;
    (c) a plurality of openings formed between the mounting flange and the valve body, the openings being in fluid communication with the fluid passage of the valve body; and
    (d) a diaphragm selectively positionable in open and closed positions to control fluid communication through the fluid passage of the valve body.

12. The valve of claim 11, wherein the fluid passage has a first diameter located at an end of the fluid passage opposite the openings, a cross-sectional area of the plurality of openings being at least as great as a cross-sectional area defined by the first diameter of the fluid passage.

13. The valve of claim 12, wherein fluid flow enters the plurality of openings in a first flow direction and flows through the fluid passage of the valve body in a second flow direction, the first flow direction being generally opposite the second flow direction.

14. The valve of claim 13, wherein the openings define an expansion region for fluid flow, the expansion region being configured to reduce flow speed to assist in redirecting fluid flow from the first flow direction to the second opposite flow direction.

15. The valve of claim 11, wherein the fluid passage defines a tapered diameter at the second end of the fluid passage, the tapered diameter being configured to correspond to an inner diameter of a fluid communication pipe when the valve is mounted on the fluid communication pipe.

16. The valve of claim 11, wherein the diaphragm and valve body further define an annulus area located adjacent to the fluid passage, the annulus area being at least as large as a cross-sectional area defined by a minimum diameter of the fluid passage.

17. The valve of claim 16, wherein the annulus area is no larger than a combined area defined by the plurality of openings formed between the mounting flange and the valve body.

18. The nozzle of claim 9, wherein air flow exits the nozzle body through the multiple exhaust tubes in a non-perpendicular direction relative to a centerline of the primary fluid jet passage.

19. The nozzle of claim 18, wherein the non-perpendicular direction of the exiting air flow is directed at an angle of between 0 and 24 degrees relative to the centerline of the primary fluid jet passage.

20. The nozzle of claim 9, wherein the diffuser arrangement is interconnected to the nozzle body by arms.

21. The nozzle of claim 9, wherein the diffuser element is spaced apart from the second end of the nozzle body.

* * * * *

UNITED STATES PATENT AND TRADEMARK OFFICE
CERTIFICATE OF CORRECTION

PATENT NO. : 7,195,659 B2
APPLICATION NO. : 10/731556
DATED : March 27, 2007
INVENTOR(S) : Sporre et al.

Page 1 of 1

It is certified that error appears in the above-identified patent and that said Letters Patent is hereby corrected as shown below:

Col. 1, line 9: "SYSTEM ANT)" should read --SYSTEM AND--

Col. 4, line 51: "first end 168 (FIG. 5)" should read --first end 108 (FIG. 5)--

Col. 9, line 22: "shown in FIG. 1, the" should read --shown in FIG. 11, the--

Col. 11, line 28: "total often separate" should read --total of ten separate--

Signed and Sealed this

Twenty-third Day of October, 2007

JON W. DUDAS
*Director of the United States Patent and Trademark Office*